(12) United States Patent
Lamm

(10) Patent No.: US 6,952,087 B2
(45) Date of Patent: Oct. 4, 2005

(54) METHOD FOR CONTROLLING AN ADJUSTMENT PROCESS OF A PART

(75) Inventor: Hubert Lamm, Kappelrodeck (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/149,782

(22) PCT Filed: Oct. 25, 2001

(86) PCT No.: PCT/DE01/04048

§ 371 (c)(1),
(2), (4) Date: Jun. 13, 2002

(87) PCT Pub. No.: WO02/35674

PCT Pub. Date: May 2, 2002

(65) Prior Publication Data

US 2002/0190679 A1 Dec. 19, 2002

(30) Foreign Application Priority Data

Oct. 27, 2000 (DE) ......................................... 100 48 601

(51) Int. Cl.$^7$ .............................. G05B 5/00; H02P 7/00
(52) U.S. Cl. ........................ 318/283; 318/456; 318/466; 318/434; 318/468; 318/282; 49/26; 49/28
(58) Field of Search ................................ 318/280, 282, 318/286, 283, 256, 445, 466, 468, 456, 434; 49/26, 28

(56) References Cited

U.S. PATENT DOCUMENTS

| | | | | |
|---|---|---|---|---|
| 4,220,900 A | * | 9/1980 | Mintz | 318/266 |
| 4,641,067 A | * | 2/1987 | Iizawa et al. | 318/287 |
| 5,422,551 A | * | 6/1995 | Takeda et al. | 318/265 |
| 5,585,705 A | * | 12/1996 | Brieden | 318/467 |
| 5,668,451 A | * | 9/1997 | Driendl et al. | 318/466 |
| 5,734,244 A | * | 3/1998 | Lill et al. | 318/452 |
| 5,801,501 A | * | 9/1998 | Redelberger | 318/283 |
| 5,977,732 A | * | 11/1999 | Matsumoto | 318/283 |
| 6,051,945 A | * | 4/2000 | Furukawa | 318/280 |
| 6,150,785 A | * | 11/2000 | Butscher et al. | 318/468 |

FOREIGN PATENT DOCUMENTS

DE 195 14 257 C1 7/1996
JP 10257791 A * 9/1998 ............. H02P/5/06

* cited by examiner

Primary Examiner—Marlon T. Flechef
Assistant Examiner—Eduardo Colon Santana
(74) Attorney, Agent, or Firm—Michael J. Striker

(57) ABSTRACT

In the method of controlling a process for moving a part (20) by an electric motor (12) against an end stop, pinching events are detected by monitoring a motor operating variable, such as a motor rpm, and if pinching is detected the motor (12) is stopped and/or reversed. The electric power triggering the motor (12) at the start of and during a startup phase while system slack is taken up is controlled so that it is constant and lower than the power triggering the motor in an ensuing operating phase (54) in which the part (20) moves. Preferably power during the startup phase is reduced to power values that are just barely enough to move the motor while system slack is taken up. In a preferred embodiment the applied motor voltage is reduced and controlled by a power end stage that includes a bipolar transistor or a field effect transistor.

11 Claims, 3 Drawing Sheets

METHOD FOR CONTROLLING AN ADJUSTMENT PROCESS OF A PART

PRIOR ART

Figure 1:
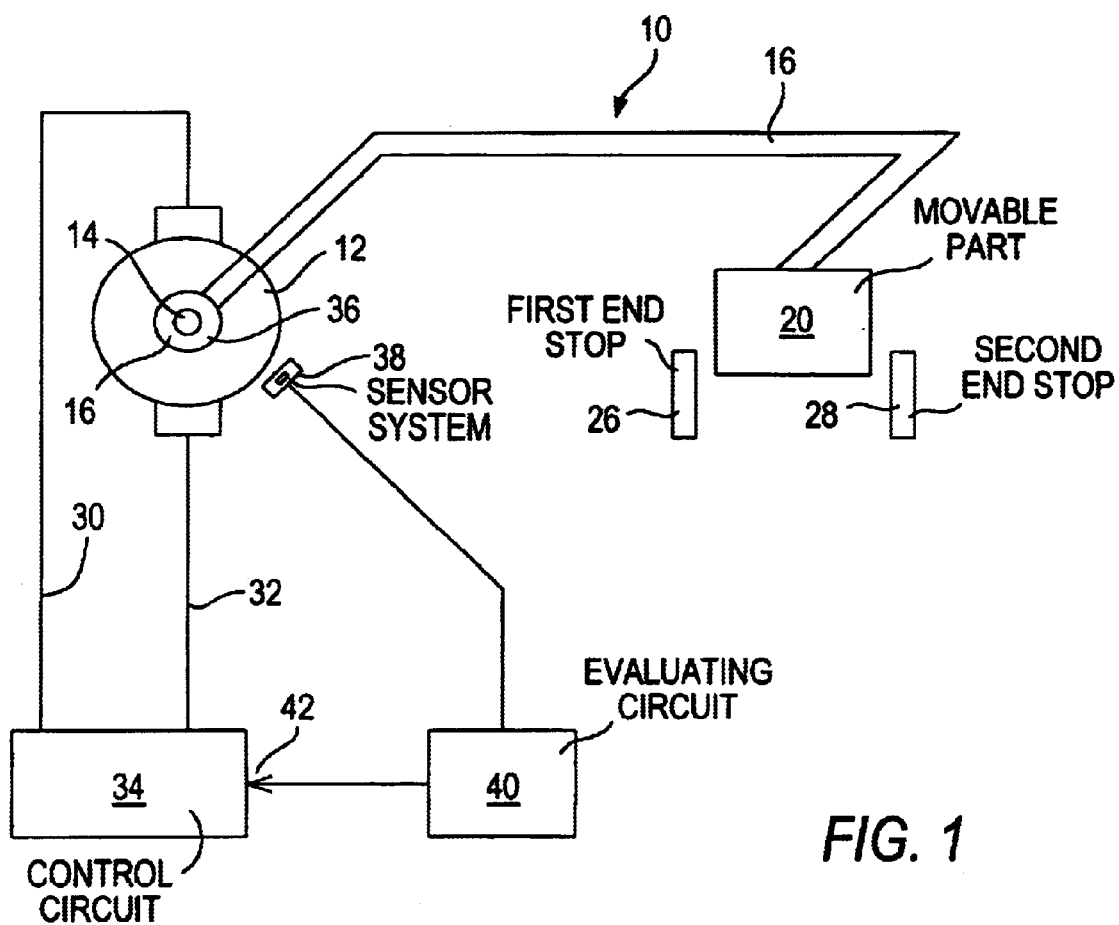

The invention relates to a method for controlling an adjustment process as generically defined by the preamble to the main claim.

It is known for parts to be combined with a motor drive mechanism that moves the parts along an adjustment path. The parts can be moved against at least one terminal position, and in particular can be moved back and forth between two terminal positions. Such movable parts are used in motor vehicles, for instance, as power windows or electrically actuated sliding roofs or seat adjusters. Electric closing devices for motor vehicles must by law provide a pinch protection function, which should largely preclude injuries to users from getting body parts caught.

It is especially problematic to achieve the pinch protection in the motor startup phase, since overswings in the motor rpm occur then, causing the pinch protection to be tripped by mistake. The overswinging is caused because the rpm first rises very quickly until the system slack is overcome and then suddenly drops once the part begins to move. The system slack is a composite of the production-dictated mechanical play among the individual components of the adjusting system.

German Patent DE 195 14 257 C1 has disclosed a method of monitoring an adjusting system that assures a pinch protection function even in the startup phase of the motor. By means of a sensor (Hall sensor), the rpm or speed is dictated; a period value is stored in memory and compared with a specified limit value. Since in the startup phase the motor period varies quite sharply, a steady state or in other words uniform motor operation exists only after about three motor periods, so that only then can satisfactory security against excessive development of force be assured. The initial period limit value during the motor startup phase is therefore calculated in advance, on the basis of the memorized reference values from the prior actuation of the motor. The initial period limit value (PGW*) is determined preferably on the basis of the most recent period value (PWvn) of the preceding adjustment, in accordance with the formula $PGW^* = 2 * PWvn^*(0.5 + E^{-t/\tau})$. This process is quite complex and expensive and is dependent on the preceding adjustment process. A prerequisite for such a method is that the measured values (period values) can be stored in memory continuously and made available the next time the motor is started. Moreover, this method is limited to using the rpm or speed as a sensor signal for the pinch protection function.

ADVANTAGES OF THE INVENTION

The method of the invention having the characteristics of the main claim has the advantage that an event involving pinching upon adjustment of a part can already be detected securely in the startup phase of the motor. The object of the invention is attained by triggering the motor in the startup phase at lesser power, for the sake of effectively preventing an overswing in the motor rpm and thus a problematic erroneous tripping of the pinch protection. It is therefore unnecessary to deactivate the pinch protection in the startup phase of the motor. With the method of the invention, an event involving pinching can be detected with high certainty even whenever an object or body part, when the window is open, for instance, is introduced with an exact fit into the window opening and the closing device of the window is activated only then. An especially advantageous feature is that this method can be employed in many currently used adjusting systems without major effort or expense, despite various more-complex evaluation algorithms for the pinch protection function.

By the characteristics recited in the dependent claims, advantageous refinements of the method of the main claim are possible. If the power of the motor is reduced, by triggering the motor via a power end stage operated with pulse width modulation, the advantage is attained that no power loss and thus no heat occur at the power end stage. Precise power regulation without additional expense for cooling is thus assured.

Alternatively, the power of the motor can be reduced by means of an applied variable voltage. Variable resistors, transistors, or similarly known components are suitable for this purpose. It is especially advantageous that in this precise type of power reduction, no electromagnetic interference that would require complicated interference suppression provisions in the control circuit occur.

It is advantageous if the power at the onset of the startup phase is controlled such that the motor just begins to move and the mechanical play of the adjusting system is overcome, but the movable part is not yet adjusted. Because the system slack is overcome with less power, no overswings in the motor revolution or in the sensor signal for the pinch protection function occur. Thus safer pinch protection is possible without erroneous tripping in the startup phase of the motor.

If, once the system slack has been overcome, the motor is triggered at maximum power (rated power), the part is adjusted quickly and efficiently without a perceptible time lag.

It is especially simple to increase the power linearly up to the rated power in order to prevent an overswing in the motor rotation. Moreover, unpleasant noise in the adjustment process is also avoided thereby.

By taking the actual battery voltage into account in triggering the power, the power can be set exactly in such a way that the system slack is overcome yet the movable part is not yet adjusted. The terminal voltage applied to the motor can be regulated by means of power triggering, independently of the actual battery voltage, in such a way that the power and thus the adjusting force do not increase undesirably.

The same is true if in the power triggering the ambient temperature is taken into account, since as a result its influence on the adjusting system and the control circuit can be eliminated. An undesired increase in the power or the adjusting force is thus prevented.

If the pinch protection is activated immediately as soon as the part begins to move, then the adjusting device offers optimal safety, as is increasingly demanded by motor vehicle manufacturers.

In a preferred feature of the invention, a variable inverse to the adjusting force of the part is used as the operating variable of the motor. Such operating variables can be measured in a simple way using Hall sensors. Thus no additional sensor expense for conventional adjusting systems is necessary.

If the rpm is used as the inverse variable, then it can be detected simultaneously with the adjustment path. The rpm is a very clear measurement variable that directly indicates the overswing in the motor revolution, or the avoidance thereof.

Another option for the sensor signal of the pinch protection function is a variable that is proportional to the adjusting force of the part. If the motor current is used as the sensor signal, then Hall sensors can advantageously be dispensed with. However, a force sensor that detects the adjusting force of the part directly can also be employed.

It is especially advantageous that the method of the invention for detecting events involving pinching in the motor startup phase can be employed in a simple manner in existing adjusting systems with different kinds of sensor equipment.

DRAWING

Figure 2:
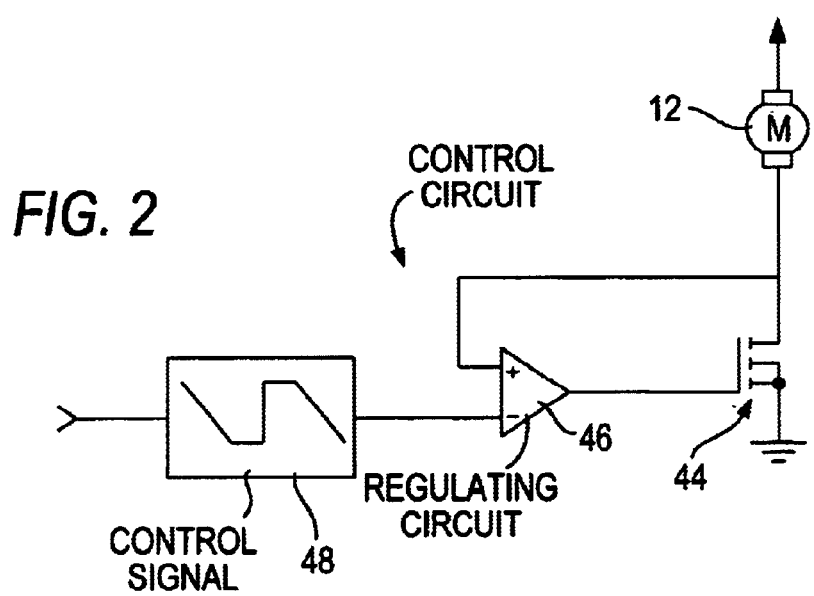
Figure 3:
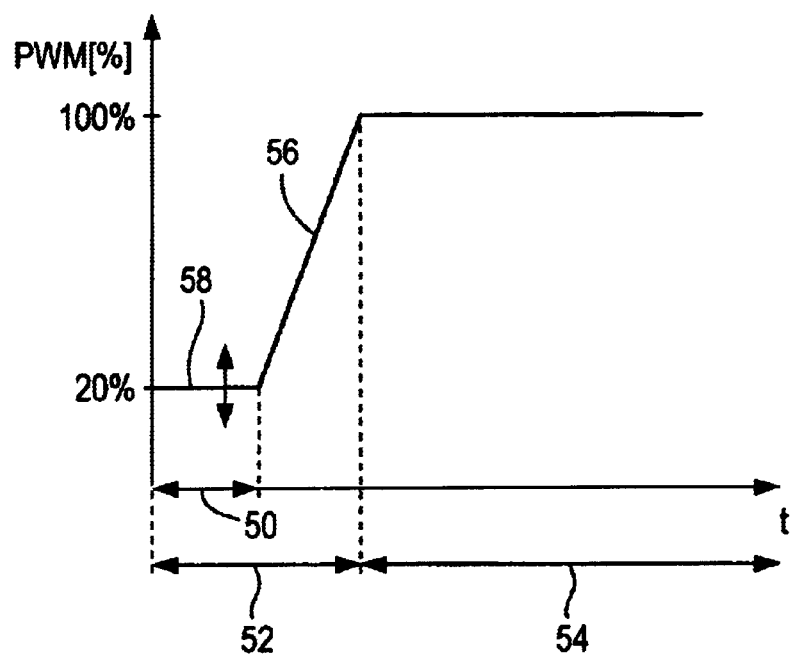
Figure 4:
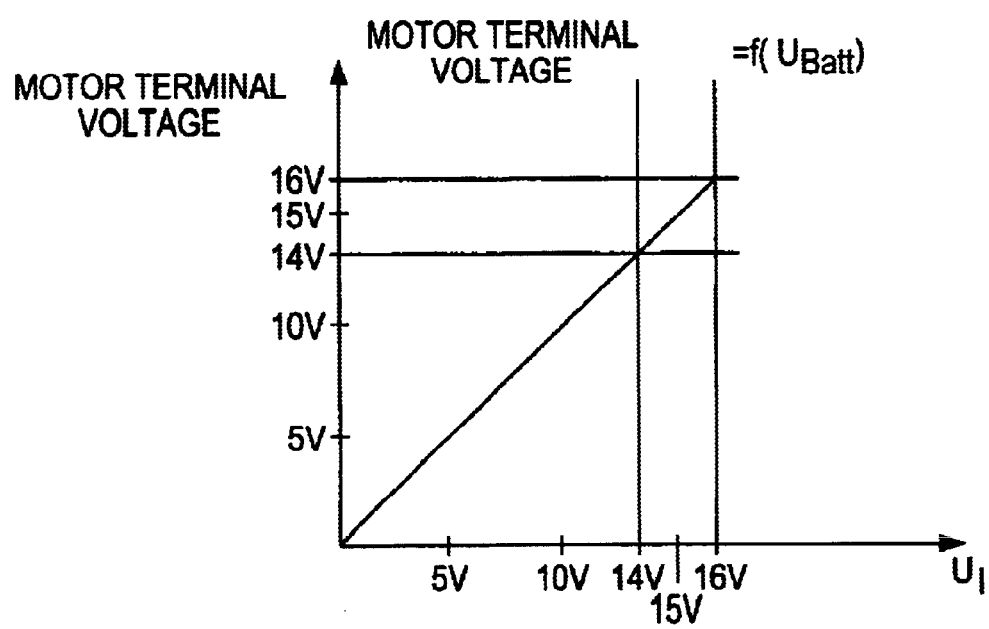
Figure 5A:
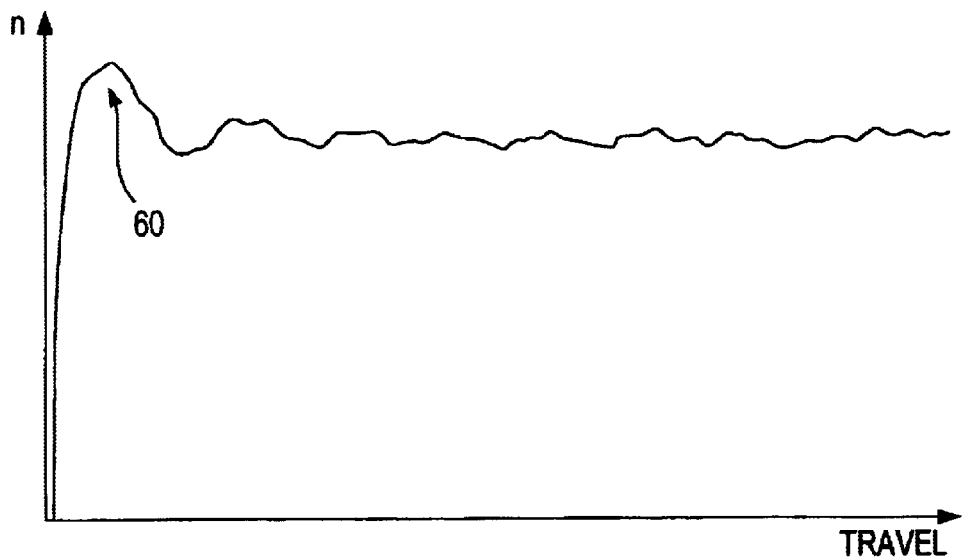
Figure 5B:
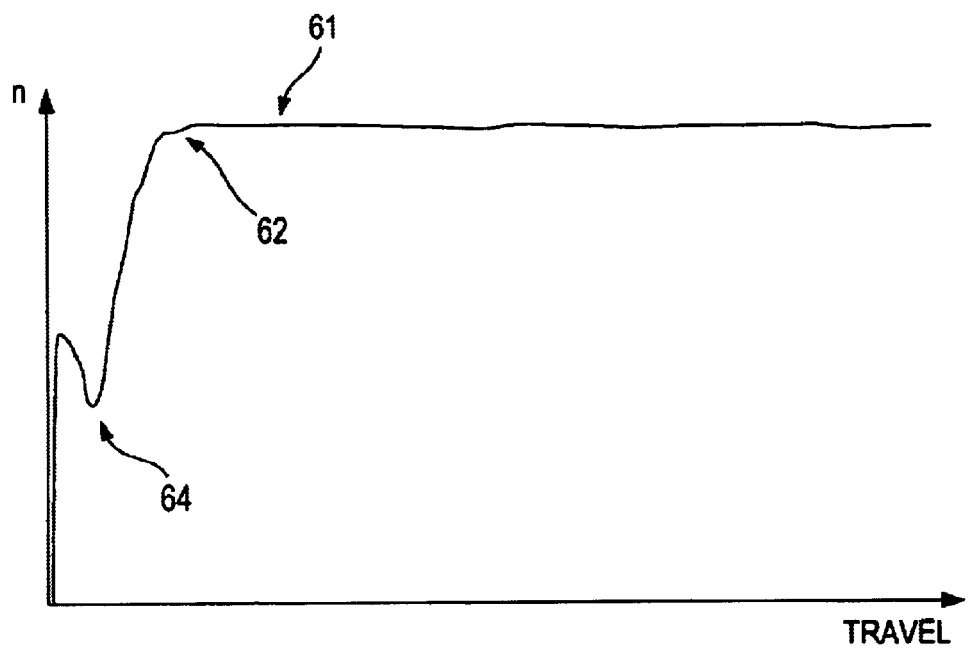

In the drawing, exemplary embodiments of a method of the invention are shown; they are described in further detail in the ensuing description. Shown are FIG. 1, a schematic arrangement for performing the method of the invention;

FIG. 2, the control circuit of an alternative exemplary embodiment;

FIG. 3, the course of the pulse width triggering of the motor of FIG. 1;

FIG. 4, the graph for power regulation as a function of the battery voltage;

FIGS. 5a and 5b, the rpm course of the motor of FIG. 1 without and with use of the method of the invention.

DESCRIPTION OF THE EXEMPLARY EMBODIMENTS

In FIG. 1, an adjusting system 10 for adjusting a part 20 is shown schematically. The adjusting system 10 has an electric motor 12, with a drive shaft 14 that engages a gear 16 that is merely represented symbolically. The gear 16 is connected via a transmission device 18 to a part 20 to be adjusted. The part 20 can be moved back and forth by means of the electric motor 12 between a first end stop 26 and a second end stop 28. Via motor connection lines 30 and 32, the electric motor 12 is connected to a control circuit 34. The drive shaft 14 of the electric motor 12 carries at least one signal transducer 36, whose signals are detectable by a sensor system 38. The sensor system 38 is connected to an evaluation circuit 40, which in turn is connected to one input 42 of the control circuit 34.

The adjusting system 10 shown in FIG. 1 can be used for instance in adjusting power windows or power sliding roofs in motor vehicles. However, these are merely two possible uses. It is understood that it is also possible to use the adjusting system 10 in any other applications in which a part 20 is movable against at least one end stop 26, 28. These applications are not limited to options for outfitting motor vehicles.

To achieve the pinch protection, the sensor system 30, via the signal transducer 36, generates a measurement signal, which is equivalent to an operating variable of the motor 12 (for instance, the motor rpm). This continuously measured operating variable is then monitored in the evaluation circuit 40. If a sudden change in the operating variable occurs (rpm drop) over the adjustment path, this change is compared with a predetermined limit value for the change in the operating variable. If the limit value is exceeded, the evaluation circuit 40 outputs a signal to the control circuit 34 to stop the motor 12 and/or reverse its direction of operation. The control circuit 34 also includes a device with which the power of the motor 12 can be varied. To that end, a control signal, which triggers a semiconductor power end stage of the motor 12, is pulse width modulated. It is possible as a result to trigger the motor 12 with less power in its startup phase 52 than in the normal operating phase 54.

FIG. 2 shows the block circuit diagram of the control circuit 34 of an exemplary embodiment. Here the power of the motor 12 is reduced by a power end stage in including a bipolar transistor 44 or an MOS field effect transistor 44. The transistor is triggered by a regulating circuit 46, which can for instance include an operational amplifier. A suitable pulsed control signal 48 is used, as a result of which the controllable transistor makes a variable voltage available to the motor 12, with which the motor power can be reduced.

An essential component of the method of the invention is that the motor 12 is driven at reduced power until the system slack of the adjusting system 10 is overcome. First, after actuation of a switch means, not shown, the electric motor 12 is set into motion via the control circuit 34. Via the rotating drive shaft 14, the gear 16 is made to mesh, so that by means of the transmission device 18, the part 20 is moved against one of the end stops 26 or 28. When the electric motor 12 is started, first a compensation for the system slack of the mechanical components of the adjusting system 10 takes place. The system slack can be described as the play between the mechanical components of the adjusting system 10. In the exemplary embodiment of FIG. 1, these are the engagement of the drive shaft 14 with the gear 16 and the transmission of the rotary motion to the transmission device 18 and the part 20 to be adjusted. Moreover, in the elastic parts of the system, a mechanical tension is built up that is equivalent to a certain motor revolution, before the part 20 moves. This means that upon a reversal of direction of the adjustment process, for instance, the drive shaft 14 is already rotating the electric motor 12 without the part 20 being in motion. The system slack appears not only, however, upon a reversal of direction of the adjusting system 10 but also, to a certain extent, each time the electric motor 12 is re-started.

FIG. 3 shows the course according to the invention of the power triggering of the motor 12 by means of pulse width modulation in accordance with FIG. 1. As the starting value, a pulse width, that is, the time during which a voltage is applied to the semiconductor end stage, of 20% is contemplated. This power just suffices to move the motor but is too low to set the part 20 into motion. The starting value of the pulse width is dependent on the particular adjusting system 10 and is ascertained experimentally in each case. The pulse width is kept constant until such time as the system slack is completely overcome, which is equivalent to the period of time $t_{systemlose}$ 50 on the time axis in FIG. 3. Next, the pulse width is increased to 100%, in order to operate the motor at maximum power than in its normal operating phase. The duration of the motor startup phase 52—that is, the time until the motor has reached its maximum power—is dependent on the choice of the starting pulse width and on the increase in the pulse width. The increase in the pulse width after the system slack is overcome is selected such that on the one hand the normal operating phase 54 is reached as fast as possible, but on the other hand overswinging of the motor revolution (see FIG. 5) is prevented. The simplest option is a linear increase in the pulse width, but some other course that meets the above conditions can also be selected.

To set the suitable starting value for the power during the time $t_{systemlose}$ 50, the ambient temperature and the battery voltage are measured and taken into account in ascertaining the starting value for the power. For instance, if the battery voltage is higher than the rated value, this is compensated for by a correspondingly lesser starting pulse width. This kind of power regulation as a function of the battery voltage is shown in FIG. 4 during the normal operating phase 54. For the maximum power (rated power), a motor terminal voltage of 14 V, for instance, is defined. If the battery voltage exceeds this value, then to maintain the predefined rated power (at a terminal voltage of 14 V), the motor terminal voltage is reduced by pulse width modulation to its rated value. At a battery voltage of 16 V, the power end stage is therefore triggered at 14/16*100% (that is, 87.5%), in order to obtain the rated power for a motor terminal voltage of 14 V. If the power in the motor startup phase is supposed to amount to only 20% of the rated power, for instance, then the pulse width of 20% is also reduced by the factor of 14/16 when a battery voltage of 16 V is applied. This prevents such high adjusting forces that they already set the part 20 into motion from occurring in the startup phase 52.

The influence of the ambient temperature on the control electronics and the mechanical adjusting system is also compensated for, so that the starting value for the power can be determined exactly in such a way that it just suffices to overcome the system slack.

In a variant of the exemplary embodiment, a constant voltage value is calculated, taking the battery voltage and the ambient temperature into account, and this value is then regulated by pulse width modulation and applied to the electric motor 12 as a starting value.

The duration of the motor startup phase 52, for a power window system, for instance, is less than 0.5 seconds. The time lag in the adjustment process from the reduction in power in the startup phase 52 is therefore hardly perceptible to the user. The advantage of this slight time lag, however, is that the pinch protection is immediately active as soon as the part 20 begins to move.

In FIG. 5a, the rpm course of the electric motor 12 is shown over the adjustment path without the method of the invention for power reduction in the motor startup phase 52. Here the rpm is an operating variable of the motor that is measured continuously by means of the sensor system 38 (as a function of the number of poles of the ring magnet). With the startup of the electric motor 12, the full rated power is immediately applied via a relay. At the onset of the motor startup phase 52, while the system slack is being overcome, the motor 12 accelerates so sharply that the rpm is above the rated rpm for the normal operating phase 54. As soon as the system slack is overcome, the contrary force of the normal operating phase 54 ensues, which is generated by the adjustment of the part 20. The motor 12 is braked as a result; the rpm decreases accordingly and then remains at an approximately constant value, which is in accordance with a constant contrary force. The overswing 60 or the drop in the motor rpm is then erroneously interpreted as an event involving pinching, since for detecting such an event involving pinching the question is asked whether the rpm is dropping in the course of the adjustment path and thus if the force brought to bear by the motor 12 is increasing. Therefore, in this conventional method, the pinch protection is not activated until the rpm has reached its steady state.

In still other conventional methods for pinch protection with a predetermined course of the lower limit value for the motor rpm over the adjustment path, an event involving pinching cannot be detected in the startup phase 54, since overswings in the rpm repeatedly occur because of the system slack, regardless of whether an object is caught or not.

FIG. 5b shows the corresponding rpm course when the method of the invention is employed; that is, initially the motor 12 is triggered with only slight power, so that the system slack is just barely overcome, but without the motor 12 being accelerated excessively. The rpm therefore drops again once the system slack has been overcome, and the motor 12 would come to a stop unless the power were now increased. However, because of the now-ensuing linear increase in the power to its maximum value, the rpm also rises accordingly to its rated value 61. An overswing in the motor rpm is thus reliably prevented 62; the pinch protection can be activated simultaneously with the onset 64 of the increase in the power or with the onset of motion of the part 20.

Instead of the motor rpm, in a variant of the exemplary embodiment some other operating variable, such as the speed, that is inverse to the adjusting force of the part 20 can be used.

In another variant of the exemplary embodiment, the motor current is measured as the operating variable. The motor current is directly proportional to the adjusting force of the part 20. Here, to detect an event involving pinching, the increase in the motor current is compared with a maximum allowed predetermined increase. The motor current is minimal at the onset of the motor startup phase 52 and after $t_{Systemlose}$ 50 rises abruptly to its maximum value when the motor 12 is operated at full power from the outset. Conversely, if by the method of the invention the power at the onset of the motor startup phase 52 is restricted and is increased linearly only after the system slack is overcome, then a sudden increase in the motor current in the motor startup phase 52 is prevented. Thus a pinch protection in the motor startup phase 52 can also be achieved using the motor current as the operating variable.

Instead of using the motor current as the operating variable, in an alternative exemplary embodiment a sensor signal can also be used, which is obtained for instance directly from the measurement of the adjusting force of a part 20. Naturally, this signal, like the motor current, is proportional to the adjusting force. The detection of an event involving pinching therefore proceeds identically to the above variant embodiment in which the motor current is used as the operating variable.

What is claimed is:

1. A method of controlling a process of moving at least one movable part (2c) by means of an electric motor (12) against at least one end stop (26, 28), in which pinching events are detected as a function of a least one operating variable of the motor (12), and if one of said pinching events is detected, the electric motor (12) is stopped and/or reversed;

wherein electric power triggering the motor at less than a maximum or rated power at start of and during a startup phase (52), system slack being taken up during said startup phase is controlled, so that said electric power is constant while the system slack is taken up and is less while the system slack is taken up than electric power triggering the motor during a subsequent operating phase in which said at least one movable part is moved to said at least one end stop and so that said electric power increases linearly only after the system slack has been overcome, wherein said subsequent operating phase occurs after said startup phase.

2. The method as defined in claim 1, wherein the motor (12) is controlled by a power end stage, and said power end stage is triggered by a control signal that is pulse-width modulated to control said electric power consumed by said motor.

3. The method as defined in claim 1, wherein said electric power triggering said motor while said system slack is taken up is equal to 20% of a maximum or rated power of the motor (12).

4. The method as defined in claim 1, wherein the motor (12) is triggered at a maximum or rated power of the motor (12) during the startup phase but only after the system slack has been overcome.

5. The method as defined in claim 1, wherein said electric power with which the motor (12) is triggered in the startup phase (52) depends on a battery voltage.

6. The method as defined in claim 1, wherein said electric power with which the motor (12) is triggered in the startup phase (52) depends on ambient temperature.

7. The method as defined in claim 1, wherein the pinching events are detected as soon as the at least one movable part (20) begins to move.

8. The method as defined in claim 1, wherein a variable inverse to an adjusting force acting on the at least one movable part (20) is the at least one operating variable.

9. The method as defined in claim 1, wherein motor rpm is the at least one operating variable.

10. The method as defined in claim 1, wherein a variable that is proportional to an adjusting force acting on the at least one movable part (20) is the at least one operating variable.

11. The method as defined in claim 1, wherein said at least one moveable part is a window or sliding roof of a motor vehicle.

* * * * *